United States Patent
Barnett et al.

(10) Patent No.: US 6,356,948 B1
(45) Date of Patent: *Mar. 12, 2002

(54) METHOD AND APPARATUS FOR MANAGING DATA

(75) Inventors: Gary E. Barnett, Gilroy, CA (US); Philip W. Barnett, Manitou Springs, CO (US)

(73) Assignee: Aspect Communications CORP, San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/915,367

(22) Filed: Aug. 20, 1997

Related U.S. Application Data (60) Provisional application No. 60/042,869, filed on Mar. 28, 1997.

(51) Int. Cl.⁷ ............................................... G06F 15/16
(52) U.S. Cl. ..................... 709/236; 709/200; 709/202; 709/203; 709/206; 709/207; 709/217; 709/219; 709/227
(58) Field of Search ................... 395/200.49, 200.31, 395/865; 370/426; 705/5; 348/2; 709/219, 201, 236, 200, 202, 203, 206, 207, 217, 227; 710/45; 704/260; 379/265.09, 265.01, 265.14, 266.01, 266.09

(56) References Cited

U.S. PATENT DOCUMENTS

| | | | | |
|---|---|---|---|---|
| 5,420,866 A | * | 5/1995 | Wasilewski | 370/426 |
| 5,706,435 A | * | 1/1998 | Barbara' et al. | 395/865 |
| 5,752,159 A | * | 5/1998 | Faust et al. | 348/2 |
| 5,754,939 A | * | 5/1998 | Herz et al. | 395/200.49 |
| 5,781,892 A | * | 7/1998 | Hunt et al. | 705/5 |
| 5,819,034 A | * | 10/1998 | Joseph et al. | 395/200.31 |
| 5,857,072 A | * | 1/1999 | Crowle | 395/200.33 |
| 5,915,238 A | * | 6/1999 | Tjaden | 704/260 |
| 5,984,054 A | * | 9/1999 | Nielsen | 709/200 |
| 5,819,284 A | * | 10/1999 | Farber et al. | 707/104 |
| 6,018,772 A | * | 1/2000 | Kamalski | 709/236 |
| 6,064,730 A | * | 6/2000 | Ginsberg | 379/265 |

* cited by examiner

Primary Examiner—Dung C. Dinh
Assistant Examiner—Chuong Ho
(74) Attorney, Agent, or Firm—Blakely, Sokoloff, Taylor & Zafman LLP (57) ABSTRACT

A system is provided for receiving, managing, and distributing data to multiple data destinations. Data is received from at least one data source normalized into a standard configuration. An identifier is associated with the normalized data. The identifier associated with the normalized data indicates the type of data included in the normalized data. The normalized data is transmitted along with the associated identifier to the multiple of data destinations. Each data destination determines whether to retrieve or ignore the normalized data based on the identifier associated with the normalized data. The normalized data may be transmitted in a data packet that includes the identifier associated with the normalized data. In certain instances, the normalized data represents a two-dimensional array of data elements.

17 Claims, 8 Drawing Sheets

| | COLUMN 1 | COLUMN 2 | COLUMN 3 | | COLUMN N |
|---|---|---|---|---|---|
| ROW S | DATA ELEMENT 1 | DATA ELEMENT 2 | DATA ELEMENT 3 | ... | DATA ELEMENT N |
| ROW S+1 | DATA ELEMENT N+1 | DATA ELEMENT N+2 | DATA ELEMENT N+3 | ... | DATA ELEMENT 2N |
| ROW S+2 | DATA ELEMENT 2N+1 | DATA ELEMENT 2N+2 | DATA ELEMENT 2N+3 | ... | DATA ELEMENT 3N |
| ROW S+3 | DATA ELEMENT 3N+1 | DATA ELEMENT 3N+2 | DATA ELEMENT 3N+3 | ... | DATA ELEMENT 4N |
| ... | ... | ... | ... | ... | ... |
| ROW S+R-1 | DATA ELEMENT (R-1)N+1 | DATA ELEMENT (R-1)N+2 | DATA ELEMENT (R-1)N+3 | ... | DATA ELEMENT RN |

R = NUMBER OF ROWS INCLUDED IN THE DATA PACKET
S = ROW NUMBER OF THE FIRST ROW IN THE DATA PACKET
N = NUMBER OF COLUMNS IN EACH ROW

METHOD AND APPARATUS FOR MANAGING DATA

This Applications claims benefit of provisional applications Ser. No. 60/042,869 filed Mar. 28, 1997.

FIELD OF THE INVENTION

The present invention relates to data management and data distribution systems. More specifically, the present invention provides a system for receiving, managing and distributing data to multiple destinations.

BACKGROUND

Various types of systems require data management and data distribution mechanisms for controlling the flow of data to multiple destinations. For example, a system requiring data distribution may include a server and multiple clients coupled to the server. The server may generate data or receive data for distribution from multiple sources. This information is then distributed to one or more clients coupled to the server. However, the server may distribute different sets or types of data to particular clients or group of clients. For example, a particular group of clients receives data related to financial matters, while another group of clients receives data related to marketing concerns.

In a client-server relationship of the type discussed above, the server must be capable of determining how to distribute data to multiple clients; i.e., which clients should receive a particular set of data or a particular data element. In systems with a large number of clients or a large amount of data to be distributed, the task of determining how to distribute the data may require a significant amount of the server's computational resources. For example, in a system having one thousand or more clients, the server maintains distribution information for each client, and distributes received data to the clients based on the distribution information. In certain known systems, a separate data packet is sent to each client identified in the distribution information as a recipient of the information. This results in a large number of data packets being transmitted across a network or other communication medium coupling the various clients to the server. This type of distribution system may be referred to as a point-to-point distribution system.

Additionally, different clients or groups of clients may receive different portions of the data (also referred to as data elements). Thus, the different data packets sent to different clients may contain a large number of common data elements. In some cases, these data packets may contain data elements that are identical to the data elements contained in other packets. This repeated transmission of identical data elements increases network traffic, and thereby increases bandwidth requirements and/or increases the time required to distribute the data.

It is therefore desirable to provide a data distribution system that reduces the repetitive transmission of identical data elements across a network or other communication system.

SUMMARY OF THE INVENTION

Embodiments of the present invention provide a system for managing and distributing data to multiple destinations. Data is received from multiple sources (or contributors) and placed into data packets. Data packets are then distributed across a network or other communication medium to multiple data destinations. The data destinations that desire the type of data within a particular data packet will retrieve the data packet from the network. Other data destinations that are not interested in the type of data within the data packet will not retrieve the data packet. Thus, instead of transmitting a separate data packet to each data destination, embodiments of the present invention transmit a single data packet that is received by multiple data destinations, thereby reducing the number of data packets transmitted.

An embodiment of the invention receives data from at least one data source. The received data is then normalized into a standard configuration. An identifier is associated with the normalized data. The normalized data and the associated identifier is then transmitted to multiple data destinations.

In particular embodiments of the invention, each data destination determines whether to retrieve the normalized data based on the identifier associated with the normalized data.

In one embodiment, the identifier associated with the normalized data indicates the type of data included in the normalized data.

In another embodiment, the normalized data is transmitted in a data packet that includes the identifier associated with the normalized data.

Other embodiments of the invention provide a data receiver coupled to receive data from at least one data source. A data normalizer is coupled to the data receiver and normalizes data received by the data receiver into a standard configuration. The data normalizer also associates an identifier with the normalized data. A data hub server coupled to the data normalizer transmits the normalized data and the associated identifier to the multiple of data destinations.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

DETAILED DESCRIPTION

The following detailed description sets forth numerous specific details to provide a thorough understanding of the invention. However, those of ordinary skill in the art will appreciate that the invention may be practiced without these specific details. In other instances, well-known methods, procedures, protocols, components, and circuits have not been described in detail so as not to obscure the invention.

Embodiments of the present invention provide a system for receiving, managing and distributing data to multiple destinations. Data is received from multiple sources (also referred to as contributors) and placed into data packets. Data packets are then broadcast or transmitted across a network or other communication medium to multiple data destinations. Only those data destinations interested in the type of data within the data packet will actually retrieve the data packet from the communication medium. Each data packet has an identifier that identifies the type or category of data contained within the data packet. The identifier may also identify a particular type or category of data destination that may be interested in retrieving the contents of the data packet. Thus, rather than transmitting a separate data packet to each data destination, the system described herein transmits a single data packet that is received by the data destinations that are interested in the type of data contained within the data packet.

Embodiments of the present invention also allow the data destination to manipulate the data retrieved from a data packet. In particular, the data destination may insert the received data into other programs or applications located at the data destination. Other embodiments of the invention permit any type of data source to provide data to a data hub server for distribution to multiple data destinations. Thus, the data management and distribution system described herein can be used to collect and distribute data from multiple sources generating different types of data or different data formats. The data collected from multiple sources may be distributed in a single data packet. A particular embodiment of the present invention collects real-time data from multiple sources and distributes the data to multiple data destinations.

Particular embodiments of the invention will be described as used in a call center environment. The call center environment is used by way of example, and represents one possible use of the invention. Those of ordinary skill in the art will appreciate that the teachings of the present invention may be applied to any type of system that collects, manages, or distributes data among various data destinations (such as client-server based systems).

Figure 1:
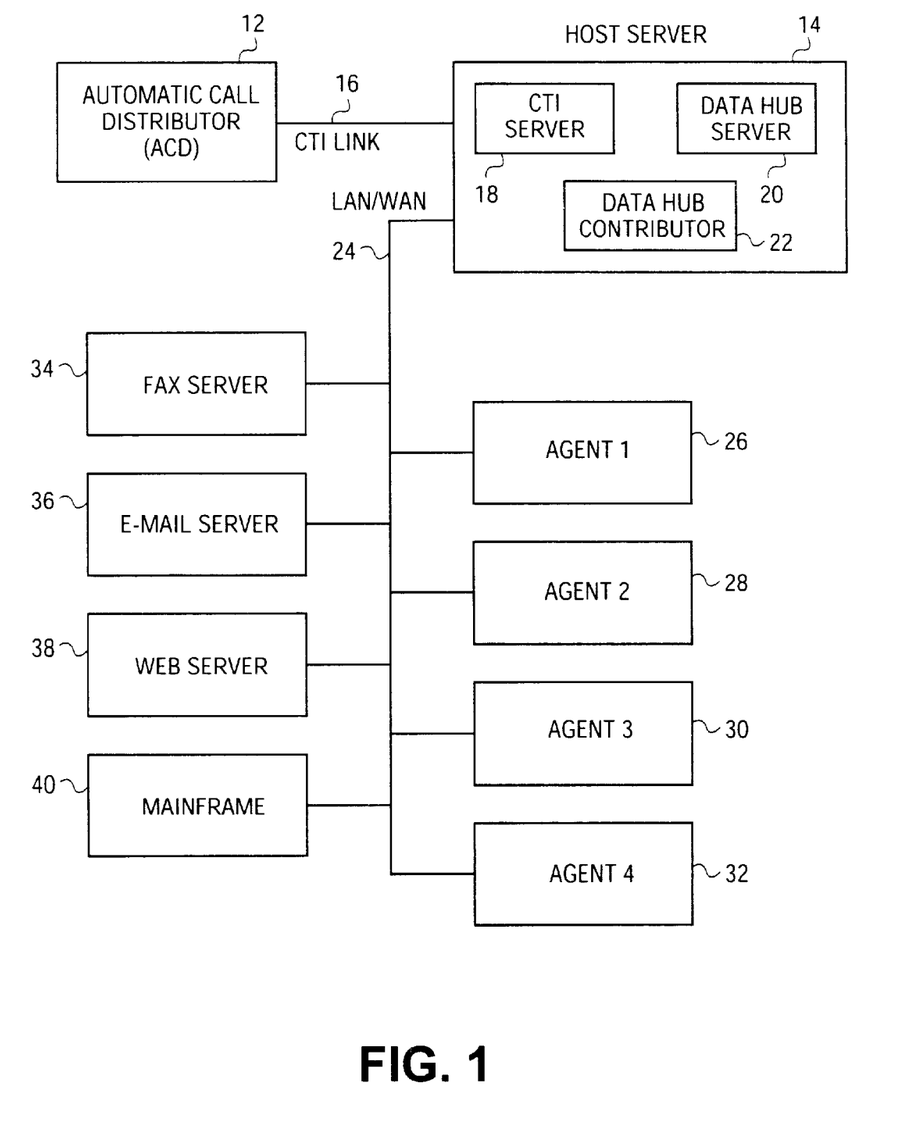
FIG. 1 illustrates an embodiment of a call center environment including an automatic call distributor (ACD), multiple servers, and multiple agents.

FIG. 1 illustrates an embodiment of a call center environment including an automatic call distributor (ACD), multiple servers, and multiple agents. An ACD 12 is coupled to a host server 14 through communication link 16. In this particular embodiment, communication link 16 is a computer telephony integration (CTI) link. Host server 14 includes a CTI server 18, a data hub server 20, and a data hub contributor 22. Although a single data hub contributor 22 is shown in host server 14, any number of data hub contributors may be contained within a host server for communication with a data hub server. CTI server 18 provides various control and management functions for communicating across CTI link 16 and communicating with other CTI components. Data hub server 20 collects data from one or more data hub contributors 22, manages the data, and distributes the data to one or more data destinations. In the example of FIG. 1, data destinations are represented as agents in a call center. An agent may include a manager, supervisor, computer system (or terminal), software routine, or any other device or mechanism capable of receiving data. Additional details regarding data hub contributor 22 are provided below.

A communication link 24 is coupled between host server 14 and multiple agents 26, 28, 30, and 32. In the example of FIG. 1, communication link 24 is a network such as a local area network (LAN), or a wide area network (WAN). Alternatively, communication link 24 may be any type of communication medium arranged in any configuration. Communication link 24 provides a mechanism for communicating data and other information between host server 14 and agents 26–32. Several other devices are also coupled to communication link 24. A fax server 34, an e-mail server 36, a web server 38, and a mainframe 40 are all coupled to communication link 24. Fax server 34 is used to receive incoming faxes and send outgoing faxes. Data received via fax or to be sent via fax may be communicated with host server 14 across communication link 24. E-mail server 36 is used to send or receive electronic mail messages and communicates data with host server 14 across communication link 24. Similarly, web server 38 communicates via the Internet (or worldwide web) and communicates data across communication link 24 to host server 14. Mainframe 40 may contain various databases, applications, and other information for communication to host server 14 across communication link 24. Various other types of servers and devices may be coupled to communication link 24 for sending and receiving data from host server 14.

Figure 2:
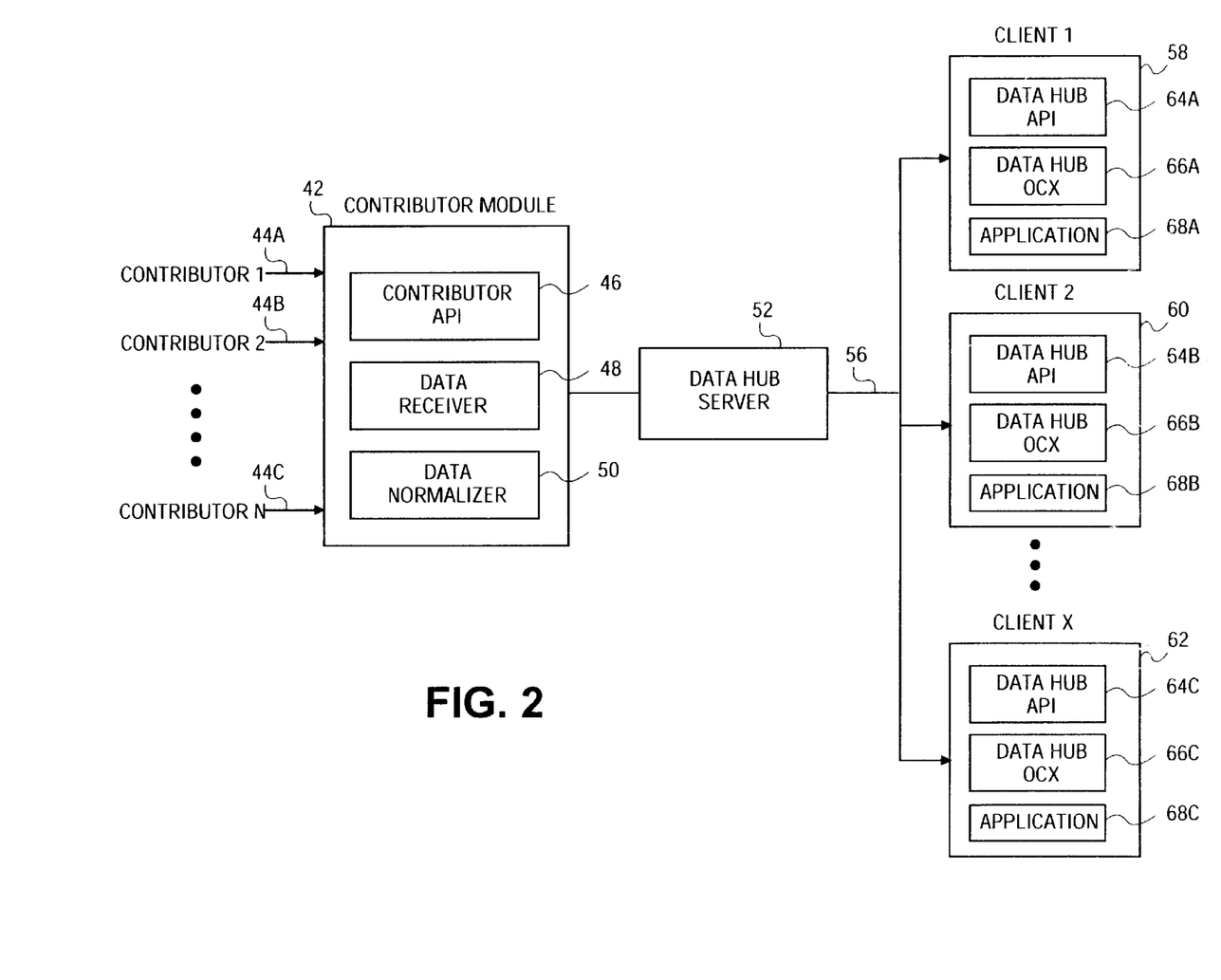
FIG. 2 illustrates an embodiment of a data management system including a contributor, a data hub server, and multiple clients.

FIG. 2 illustrates an embodiment of a data management system including a contributor module 42, a data hub server 52, and multiple clients. In this example, clients may be agents (or agent terminals), as discussed in FIG. 1, or may be applications or software routines that receive data from a server or other data source. Contributor module 42 receives data from multiple contributors 44a, 44b, and 44c. Contributors 44a–44c may generate different types of data using different data formats. Contributor module 42 is responsible for receiving data from the contributors and communicating with the contributors to control the flow of data into contributor module 42.

Contributor module 42 includes a contributor application programming interface (API) 46, a data receiver 48, and a data normalizer 50. Contributor API 46 provides the interface functions necessary for the contributors to communicate with contributor module 42. Additionally, contributor API 46 provides the necessary interface functions for contributor module 42 to communicate with data hub server 52, as discussed below. Data receiver 48 receives and, if necessary, temporarily stores incoming data as it is received from the contributors. Data normalizer 50 "normalizes" the data received from the contributors. This normalization process includes ordering the received data such that the normalized data has a particular order or structure that is the same regardless of the source (i.e., contributor) of the data. The received data may be organized into one or more InfoGrams, which are discussed in greater detail below.

Contributors include any type of data source, including an ACD, case tracking/management software, the Internet (web sites), voice mail, e-mail, databases, and other data provided by a system or software application.

Data hub server 52 receives the normalized data from contributor module 42, processes the data (as discussed below), and broadcasts the data across communication link 56 to multiple clients 58, 60, and 62. In this example, communication link 56 is a LAN or WAN. In alternate embodiments, communication link 56 may be any type of communication link using any type of communication medium for communicating data between data hub server 52 and clients 58–62. FIG. 2 illustrates three separate clients 58, 60, and 62. However, it will be appreciated that any number of clients may be coupled to data hub server 52 across communication link 56. For example, in a typical call center environment, hundreds or thousands of clients (e.g., telephone agents) may be coupled to data hub server 52.

Each client 58–62 includes a data hub API 64*a*, 64*b*, and 64*c*. Each client also includes data hub ActiveX controls (labeled "OCX") 66*a*, 66*b*, and 66*c*. In an alternative embodiment of the invention, data hub OCX 66*a*, 66*b*, and 66*c* may be OLE controls. Each client 58–62 includes one or more application programs 68*a*, 68*b*, and 68*c*. Application programs 68*a*–68*c* may be any type of application capable of receiving or utilizing data received by the client. The data hub API, data hub OCX, and the application work together to allow data distributed by data hub server 52 to be used by or incorporated into one or more applications.

Although contributor module 42 and data hub server 52 are illustrated separately in FIG. 2, in alternate embodiments of the invention, contributor module 42 and data hub server 52 may be integrated into a single module or system.

Figure 3:
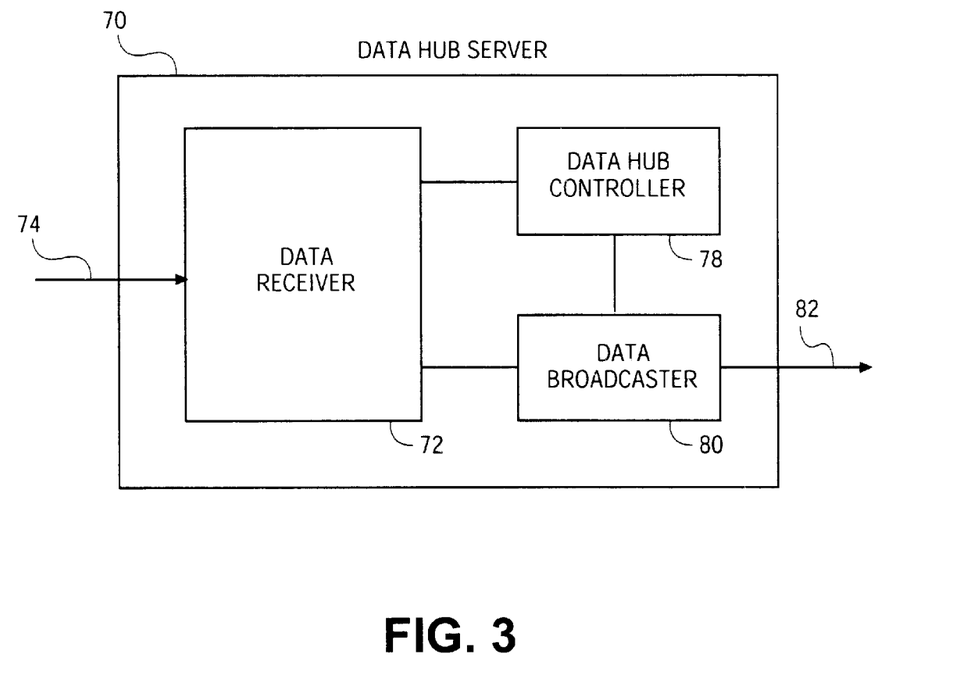
FIG. 3 illustrates an embodiment of a data hub server including various modules within the data hub server.

FIG. 3 illustrates an embodiment of a data hub server 70 including various modules within the data hub server. Data hub server 70 includes a data receiver 72, which receives data from a contributor module on communication link 74. In this example, a single contributor module is coupled to data hub server 70. However, in alternate embodiments, multiple contributor modules may be coupled to a single data hub server. Data hub server 70 also includes a data hub controller 78, which controls the operation of the data hub server. A data broadcaster 80 broadcasts (or transmits) the normalized data across a communication link 82. Communication link 82 is coupled to one or more data destinations, such as agents or clients.

Figure 4:
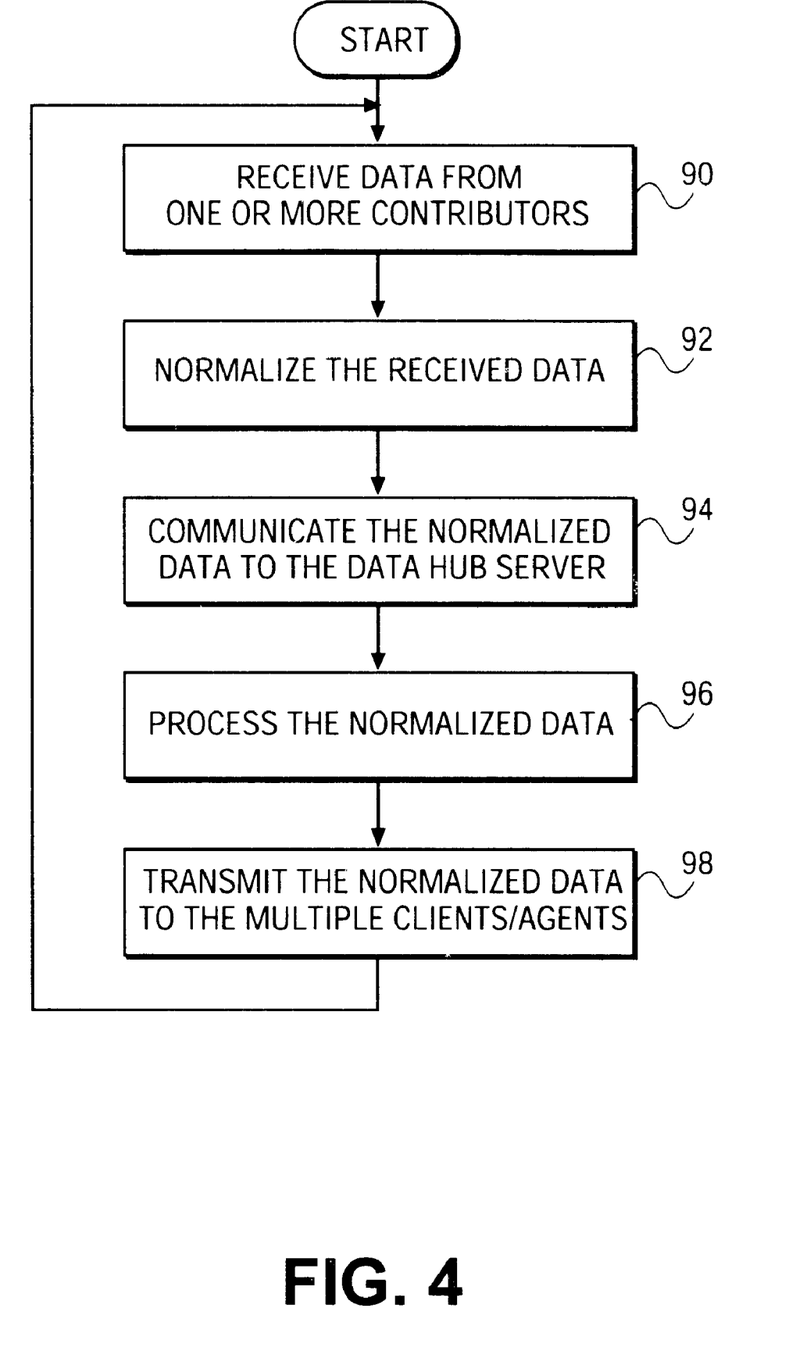
FIG. 4 is a flow diagram illustrating an embodiment of a procedure for handling the flow of data from a contributor to one or more clients.

FIG. 4 is a flow diagram illustrating an embodiment of a procedure for handling the flow of data from a contributor to one or more clients. At step 90, data is received from one or more contributors coupled to the system (e.g., coupled to contributor module 42). Step 92 normalizes the received data into a standard format (e.g., an InfoGram, discussed below). Step 94 communicates the normalized data to the data hub server. At step 96, the data hub server processes the normalized data. At step 98, the data hub server transmits the normalized data to the multiple clients or agents. Although step 98 "transmits" the data to the multiple clients or agents, only particular clients or agents may actually retrieve the transmitted data. As discussed below, each data packet has a packet identifier. The clients or agents may choose to retrieve or ignore a particular data packet based on this packet identifier and the type of data or other information associated with that packet identifier. For example, a particular packet identifier may indicate that the data contained in the packet is related to the marketing department. In this situation, only those clients or agents interested in marketing data/information will retrieve the data packet.

Figure 5:
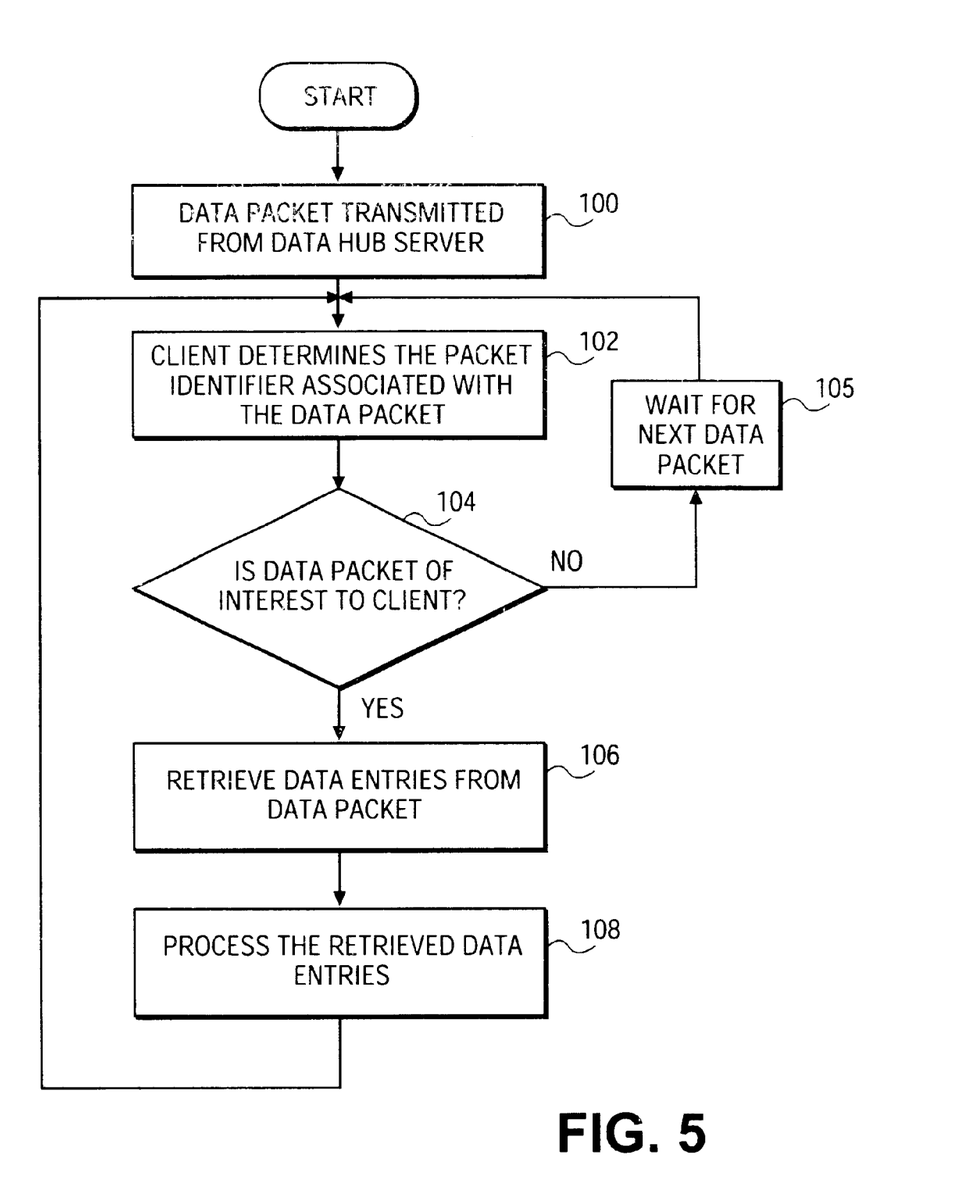
FIG. 5 is a flow diagram illustrating an embodiment of a procedure used by a client or an agent for retrieving data from a data packet.

FIG. 5 is a flow diagram illustrating an embodiment of a procedure used by a client or agent for retrieving data from a data packet. At step 100, a data packet is transmitted from the data hub server. At step 102, the client or agent determines the packet identifier associated with the data packet. Step 104 determines whether the data packet is of interest to the client or agent. This determination is made based on the data packet identifier. From the identifier, the procedure may determine, for example, the type of data contained in the data packet. If the data packet is not of interest to the client or agent, then the procedure branches to step 105 to await the next data packet. If the data packet is of interest to the client or agent, then the procedure continues from step 104 to step 106, where the data entries are retrieved from the data packet. Step 108 processes the data entries using software modules, application programs, or other systems contained in the client or agent system.

Figure 6:
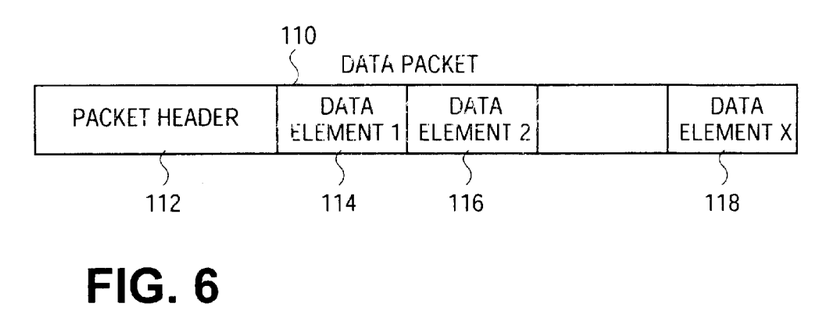
FIG. 6 illustrates an embodiment of a data packet containing a packet header and multiple data elements.

FIG. 6 illustrates an embodiment of a data packet containing a packet header and multiple data elements. Data packet 110 includes a packet header 112, a first data element 114, a second data element 116, and a final data element 118. A particular data packet 110 may include any number of data elements 114–118, depending on the amount of data being transmitted.

Figure 7:
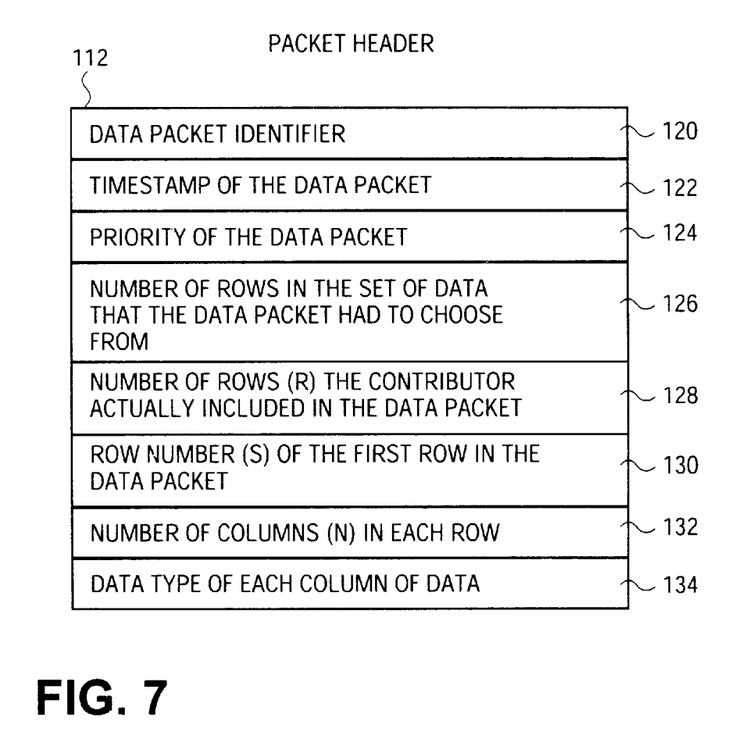
FIG. 7 illustrates an embodiment of a data packet header including various information regarding the data elements contained in the data packet.

FIG. 7 illustrates an embodiment of data packet header 112 including various information regarding the data elements contained in the data packet. Packet header 112 includes a data packet identifier 120, a timestamp of the data packet 122, and a priority associated with the data packet 124. Packet header 112 also includes the number of rows in the set of data that the data packet had to choose from 126. The number of rows (r) the contributor actually included in the data packet is identified by 128. The row number (s) of the first row in the data packet is identified by 130. The number of columns (n) in each row is identified by 132, and the data type of each column of data is identified by 134.

Figure 8:
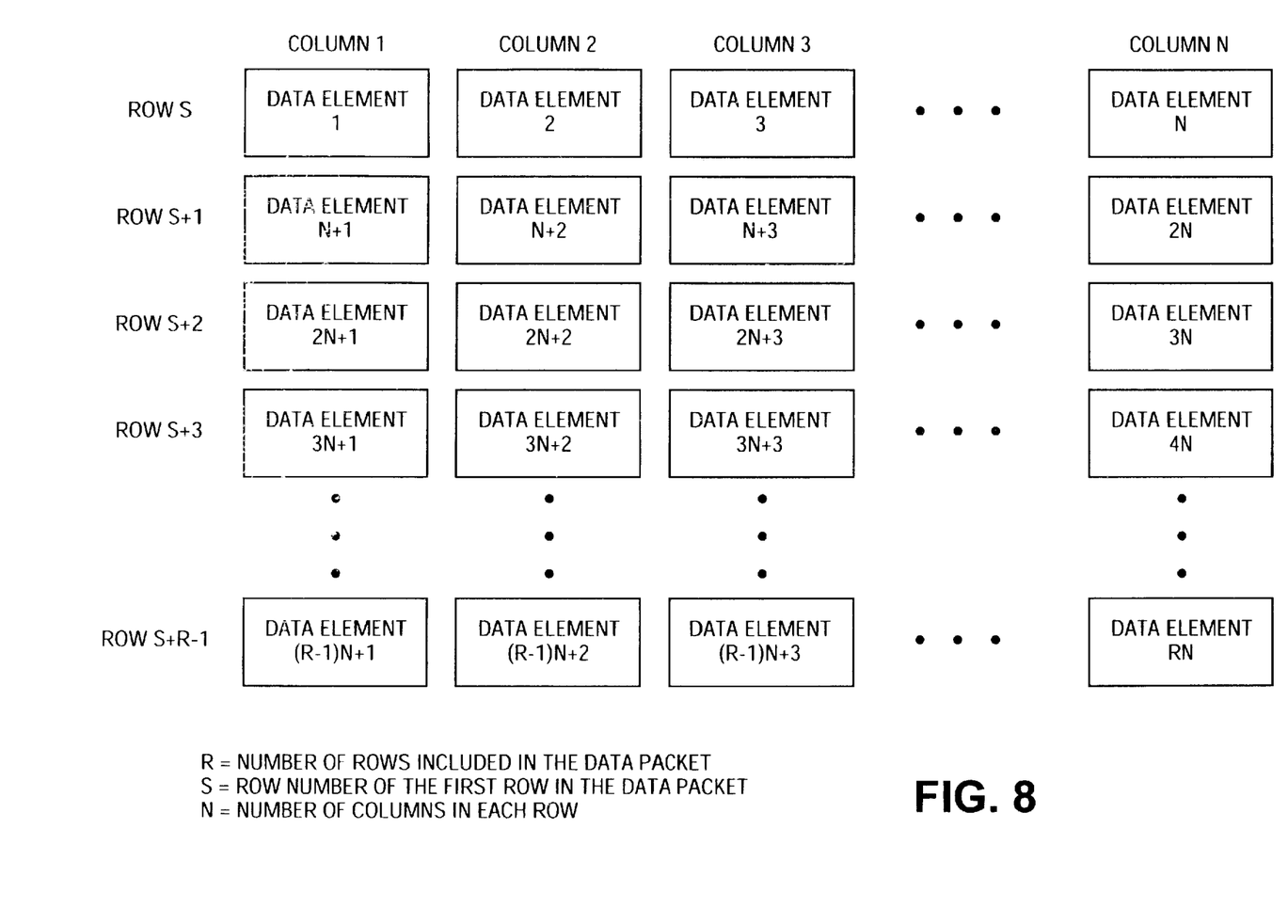
FIG. 8 illustrates an embodiment of an ordering of data elements contained within a data packet.

FIG. 8 illustrates an embodiment of an ordering of data elements (normalized data) contained within a data packet. In this example, multiple rows and multiple columns of data elements are illustrated. Although the various data elements in FIG. 8 are illustrated in a two-dimensional array, the data elements are transmitted within a data packet in a linear manner. For example, as illustrated in FIG. 8, data elements are transmitted in the data packet based on rows. In this example, row s is the first row of data elements contained in the data packet. Next, row s+1 follows row s in the data packet. This arrangement continues until all data elements are included in the data packet.

The two-dimensional array illustrated in FIG. 8 is helpful in identifying the information contained in the various data elements within a data packet. In a particular embodiment of the invention, columns are used to define categories or types of information that are conveyed by the data elements. For example, in a call center environment, column 1 may contain data regarding the number of callers currently waiting to be serviced and column 2 may contain data regarding the caller who has been waiting the longest for service. Column 3 may contain information regarding the average wait that callers have experienced for the particular day and a fourth column may identify the total number of calls received for a particular day. Each row within the two-dimensional array shown in FIG. 8 represents a separate agent or group of agents with which the data is associated. For example, row s may contain the data elements associated with a first group of agents, and row s+1 may contain information regarding a second group of agents. Additionally, a particular row may contain information related to a particular agent, rather than a group of agents. It will be appreciated that various other types of categorizations may be performed based on row and column configurations.

The data configuration shown in FIG. 8 may be referred to as an InfoGram. An InfoGram has a particular identifier (e.g., a number) associated with it to identify the InfoGram. For example, a particular system may have InfoGram #1 for identifying the number of calls waiting and the longest waiting time for the calls currently in the queue. Another InfoGram (InfoGram #2) may contain data identifying the status of various cases (e.g., problems to be resolved) that have been submitted to the system (e.g., the number of cases received, and the number of cases closed).

The data hub server is the central broadcast point for InfoGrams contributed by various data sources, called contributors. InfoGrams are data packets, and their content depends on the contributor. The data hub server broadcasts InfoGrams without regard to which of the multiple destinations will actually retrieve the data contained in the InfoGram. A destination (e.g., a client or an agent) can be any type of application or system that desires to monitor InfoGrams. A destination can retrieve data from multiple InfoGrams. InfoGrams contain rows and columns of data, where each row may be thought of as a data record and each column as a data field. Each InfoGram contains header information that describes the rows and columns of the InfoGram.

Using the structure shown in FIG. 8, columns are used to identify a particular statistic or type of data and the rows are used to identify different agents or groups of agents. For example, InfoGram #1 may have two columns, one for the number of calls waiting and another for the longest wait of all calls currently in queue. InfoGram #1 may have ten rows, one for each group of agents. Thus, the statistics for all ten groups are provided in the 2×10 array of data. Similarly, InfoGram #2 may contain three columns, one for the number of cases submitted today, a second column for the number of cases closed today, and a third column for the number of cases that remain open. In this example, InfoGram #2 may contain 25 rows, one row for each group of agents that handle cases.

The identifier of the InfoGram is associated with a particular internet protocol (IP) address and user datagram protocol (UDP) port number. For example, InfoGram #1 may be associated with IP address 240.5.10.15 and UDP port #98. The data hub server handles the conversion of the InfoGram identifier to a corresponding IP address and UDP port number.

Each InfoGram may also have an associated priority. This priority is used to determine the order of processing two InfoGrams having the same identifier. Additional parameters associated with each InfoGram may determine the manner in which the InfoGram is distributed. For example, an InfoGram may be distributed each time new data is received from a contributor. Alternatively, an InfoGram may be distributed every 20 seconds, regardless of whether the data has changed since the previous InfoGram was distributed. Each InfoGram may be configured in a different manner (e.g., InfoGram #1 may be distributed every 20 seconds, while InfoGram #2 is distributed only after a change in the data occurs). By distributing an InfoGram periodically (e.g., every 20 seconds), new data destinations that have recently been established will quickly receive data, rather than waiting a significant time for a change in the data to occur.

Various codes may be entered into data entries within an InfoGram to indicate the status of data in the InfoGram. For example, a particular code in a data entry may indicate that the remainder of the data entries in the row are empty or invalid. Various other types of information can be conveyed by including codes within the InfoGram. A timestamp may be included in an InfoGram for synchronizing events or data received from sources in different time zones.

A particular type of InfoGram, referred to as a beacon InfoGram, contains no rows or columns. It consists only of the InfoGram header information. The purpose of this beacon InfoGram is to inform the various destinations that the data hub server is functioning properly.

As discussed above, a contributor module may obtain information from a variety of sources, such as real-time data bases or shared memory. Contributor modules may dynamically add new InfoGram identifiers to the data hub server or may contribute InfoGrams with an existing InfoGram identifier. Additionally, several contributor modules may contribute the same InfoGram identifier, thereby combining multiple data sources or providing redundant data streams.

The receiver custom ActiveX control allows an ActiveX container application, such as a Visual Basic form application, to receive InfoGrams broadcast by the data hub server. The receiver custom control receives InfoGrams into the container application, but does not necessarily act upon them itself. Instead, it may be up to the container application to act upon or display the InfoGram contents.

Figure 9:
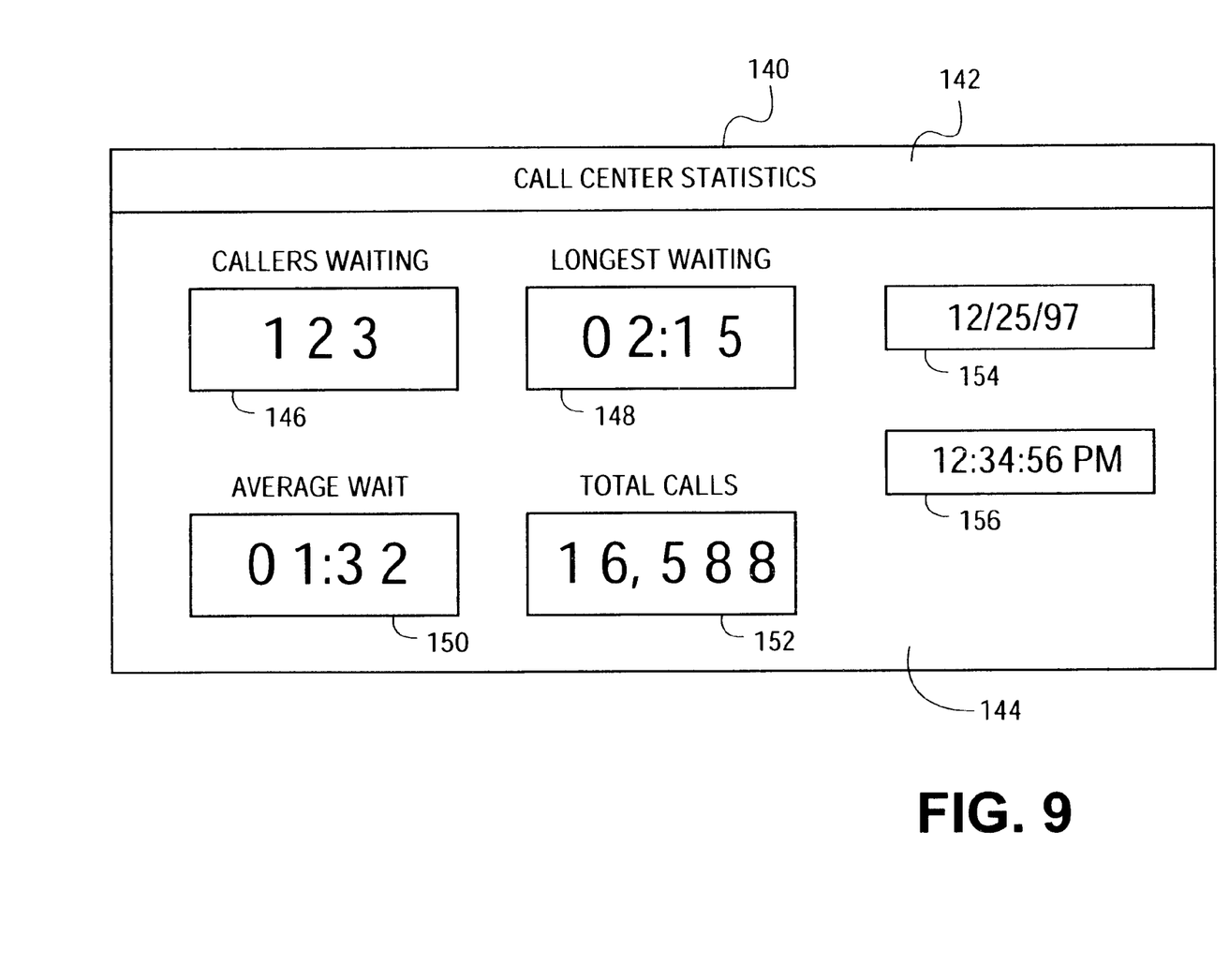
FIG. 9 illustrates an embodiment of a display containing information regarding call center statistics, based on data received in data packets by a client or agent.

FIG. 9 illustrates an embodiment of a display containing information regarding call center statistics, based on data received in data packets by a client or agent. Display 140 may include a title 142, such as "Call Center Statistics." A display area 144 includes a caller waiting display 146, a longest waiting display 148, an average wait display 150, and a total calls display 152. Additionally, the date 154 and time 156 associated with the current data is displayed.

The various data provided on display 140 will vary depending on the data source (e.g., the contributor). Additionally, the data selected by a particular agent or client may vary depending on the requirements of the agent or client. For example, a supervisor or manager may desire one set of data while a particular application program may desire different data. Furthermore, different users may utilize the same data in different manners. For example, one manager may desire all data regarding all agents in a particular group, while another manager may only desire summary information about the group as a whole. A particular agent may only retrieve data regarding their own performance, ignoring information related to other agents in the group.

Embodiments of the present invention may include code sequences, instructions, parameters, and other information stored on a processor-readable medium (or computer-readable medium). The code sequences, instructions, parameters, and other information are used to perform various data processing and data management operations, such as the procedures described above. The processor-readable medium may be any type of magnetic, optical, or electrical storage medium including a disk, diskette, CD-ROM, tape, memory device, or similar storage medium.

The data management system described above may be implemented using any type of computer or processor-based system. A particular system may include a processor, a cache memory, and one or more input/output (I/O) buses. The system may also include a network/communication interface, system memory, video memory, a display device, a mass storage device, a keyboard, and a pointing device. The network/communication interface is used to provide communication between various components of the system. Any of a wide range of conventional networks, such as an Ethernet network, Token Ring network, the Internet, etc. may be used. Furthermore, any communication protocol (e.g., transmission control protocol/internet protocol (TCP/IP)) may be used to communicate information through the system.

The mass storage device is used to provide permanent storage for the data and programming instructions used to implement the above-described functions. The system memory is used to provide temporary storage for the data and programming instructions when executed by a processor. The mass storage device may be provided with the programming instructions by loading the programming instructions from a distribution storage medium, or by downloading the programming distributions from a server. Collectively, these elements are intended to represent a broad category of hardware systems, including but not limited to, general purpose computer systems.

From the above description and drawings, it will be understood by those of ordinary skill in the art that the particular embodiments shown and described are for purposes of illustration only and are not intended to limit the scope of the invention. Those of ordinary skill in the art will recognize that the invention may be embodied in other specific forms without departing from its spirit or essential characteristics. References to details of particular embodiments are not intended to limit the scope of the claims.

What is claimed is:

1. A method of distributing customer interaction statistical data within a customer interaction environment to a plurality of data destinations, the method comprising:

formatting data, received from a plurality of data sources within the customer interaction environment and concerning customer interaction parameters, into a predetermined format;

associating an identifier with the formatted data; and transmitting a single transmission of the formatted data and the associated identifier to the plurality of data destinations, wherein the identifier identifies at least one statistical data type of the formatted data within the context of the customer interaction environment and wherein the at least one statistical data type is selected from a group comprising a number of customer calls waiting, a longest waiting time for customer calls in a queue, data concerning a customer call that has been waiting the longest, an average wait time for a customer call, a status of cases open, a number of cases opened during a first predetermined period, a number of cases closed during a second predetermined period and a number of cases to remain open.

2. The method of claim 1 wherein each of the plurality of data destinations determines whether to retrieve the formatted data based on the at least one statistical data type of the formatted data identified by the identifier associated with the formatted data.

3. The method of claim 1 wherein the formatted data is transmitted in a data packet, and wherein the data packet includes the identifier associated with the formatted data.

4. The method of claim 1 wherein the formatted data represents a two-dimensional array of data elements.

5. A method for selectively retrieving data packets, containing statistical data, at a data destination within a customer interaction environment, wherein the data packets are distributed from at least one data source, the method comprising:

determining an identifier associated with a data packet, the identifier identifying at least one statistical data type of the data packet within the context of the customer interaction environment;

determining whether the data packet is of interest to the data destination based on the at least one statistical data type of the data packet as identified by the identifier associated with the data packet;

retrieving the data packet if the data packet is of interest to the data destination for the purposes of generating a statistical report; and ignoring the data packet if the data packet is not of interest to the data destination for the purposes of generating the statistical report, wherein the at least one statistical data type is selected from a group comprising a number of customer calls waiting, a longest waiting time for customer calls in a queue, data concerning a customer call that has been waiting the longest, an average wait time for a customer call, a status of cases open, a number of cases opened during a first predetermined period, a number of cases closed during a second predetermined period and a number of cases to remain open.

6. The method of claim 5 wherein the identifier is included within the data packet.

7. A method of managing statistical data gathered from multiple data sources within a customer interaction environment, the method comprising:

receiving data, concerning customer interaction parameters, from a plurality of data sources within the customer interaction environment, wherein at least two data sources generate different types of data;

formatting the received data into a predetermined format; and associating an identifier with the formatted data, wherein the identifier indicates at least one statistical data type of data included in the formatted data, wherein the formatted data is transmitted to a destination in a data packet, the data packet includes the identifier associated with the formatted data, and the at least one statistical data type is selected from a group comprising a number of customer calls waiting, a longest waiting time for customer calls in a queue, data concerning a customer call that has been waiting the longest, an average wait time for a customer call, a status of cases open, a number of cases opened during a first predetermined period, a number of cases closed during a second predetermined period and a number of cases to remain open.

8. The method of claim 7 wherein the formatted data represents a two-dimensional array of data elements.

9. Apparatus for distributing customer interaction statistical data to a plurality of data destinations, the apparatus comprising:

a data receiver coupled to receive data, concerning customer interaction parameters, from a plurality of data sources within a customer interaction environment;

a data formatter, coupled to the data receiver, to format the data received by the data receiver, wherein the data formatter is to format the received data into a predetermined format, and wherein the data formatter is to associate an identifier with the formatted data, wherein the identifier identifies at least one statistical data type of the formatted data within the context of the customer interaction environment; and a data hub server, coupled to the data formatter, to transmit the formatted data and the associated identifier to the plurality of data destinations, wherein the at least one statistical data type is selected from a group comprising a number of customer calls waiting, a longest waiting time for customer calls in a queue, data concerning a customer call that has been waiting the longest, an average wait time for a customer call, a status of cases open, a number of cases opened during a first predetermined period, a number of cases closed during a second predetermined period and a number of cases to remain open.

10. The apparatus of claim 9 wherein each of the plurality of data destinations determines whether to retrieve or ignore the formatted data based on the at least one statistical data type of the formatted data as indicated by the identifier associated with the formatted data.

11. The apparatus of claim 9 wherein the data hub server transmits the formatted data in a data packet, and wherein the data packet includes the identifier associated with the formatted data.

12. Apparatus for distributing customer interaction statistical data to a plurality of data destinations within a customer interaction environment, the apparatus comprising:

means for receiving data, concerning customer interaction parameters, from a plurality of data sources within the customer interaction environment;

means for formatting the received data into a predetermined format, wherein the means for formatting associates an identifier with the formatted data, the identifier identifying at least one statistical data type of the formatted data within the context of the customer interaction environment; and means for transmitting the formatted data and the associated identifier to the plurality of data destinations, wherein the at least one statistical data type is selected from a group comprising a number of customer calls waiting, a longest waiting time for customer calls in a queue, data concerning a customer call that has been waiting the longest, an average wait time for a customer call, a status of cases open, a number of cases opened during a first predetermined period, a number of cases closed during a second predetermined period and a number of cases to remain open.

13. The apparatus of claim 12 wherein each of the plurality of data destinations determines whether to retrieve or ignore the formatted data based on the at least one statistical data type of the formatted data as identified by the identifier associated with the formatted data.

14. The apparatus of claim 12 wherein the means for transmitting the formatted data transmits the formatted data in a data packet, and wherein the data packet includes the identifier associated with the formatted data.

15. A computer-readable medium having stored thereon a sequence of instructions which, when executed by a computer, causes the computer to:

receive data, concerning customer interaction parameters, from at least one data source within a customer interaction environment;

format the received data into a predetermined format;

associate an identifier with the formatted data, the identifier identifying at least one statistical data type for the formatted data within the context of the customer interaction environment; and transmit the formatted data and the associated identifier to the plurality of data destinations, wherein the at least one statistical data type is selected from a group comprising a number of customer calls waiting, a longest waiting time for customer calls in a queue, data concerning a customer call that has been waiting the longest, an average wait time for a customer call, a status of cases open, a number of cases opened during a first predetermined period, a number of cases closed during a second predetermined period and a number of cases to remain open.

16. The computer software product of claim 15 wherein the processor receives data from multiple data sources.

17. The computer software product of claim 15 wherein the formatted data is transmitted in a data packet, and wherein the data packet includes the identifier associated with the formatted data.

* * * * *